(12) United States Patent
Clark et al.

(10) Patent No.: US 7,296,372 B2
(45) Date of Patent: Nov. 20, 2007

(54) RETAIL DISPLAY ARTICLE AND SYSTEM

(75) Inventors: Jeremy A. Clark, Minneapolis, MN (US); Michael A. Whittier, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 477 days.

(21) Appl. No.: 10/958,142

(22) Filed: Oct. 4, 2004

(65) Prior Publication Data

US 2006/0070276 A1 Apr. 6, 2006

(51) Int. Cl.
G09F 1/08 (2006.01)

(52) U.S. Cl. .............................. 40/617; 40/538; 40/322; 40/360

(58) Field of Classification Search .................. 40/617, 40/538, 322, 360; 223/85, 87
See application file for complete search history.

(56) References Cited

U.S. PATENT DOCUMENTS

| | | |
|---|---|---|
| D615,025 | 11/1898 | Hulbert |
| D59,241 S | 10/1921 | Lion |
| D72,148 S | 3/1927 | Gill |
| D78,366 S | 4/1929 | Shepard |
| D99,034 S | 3/1936 | Fevre |
| 2,240,024 A | 4/1941 | Stone et al. |
| 2,648,151 A | 8/1953 | Kindred |
| 2,737,742 A | 3/1956 | Leigh |
| 2,824,395 A | 2/1958 | Decker et al. |
| D199,471 S | 10/1964 | Leibow |
| 3,722,122 A | 3/1973 | Sesto |
| 3,766,675 A | 10/1973 | Leigh |
| 3,969,837 A | 7/1976 | Kresse |
| 4,034,496 A | 7/1977 | Cohen |
| 4,123,862 A | 11/1978 | Dyer et al. |
| 4,214,392 A | 7/1980 | Virsen |
| D283,148 S | 3/1986 | Coyne |
| 4,633,607 A | 1/1987 | Brasch et al. |
| D307,606 S | 5/1990 | Jervis, Sr. |
| D308,229 S | 5/1990 | Jervis, Sr. |
| D308,398 S | 6/1990 | Sartz |
| D314,530 S | 2/1991 | Eyal |
| D316,571 S | 4/1991 | Romero-Comas et al. |

(Continued)

OTHER PUBLICATIONS

"The Benefits and Value of New Generation Holography," <http://www.litholographics.com/applications/applications.htm>.

(Continued)

Primary Examiner—Christopher P. Ellis
Assistant Examiner—Brian Swenson
(74) Attorney, Agent, or Firm—Ingrassia Fisher & Lorenz, P.C.

(57) ABSTRACT

A retail display article based upon an original photograph of a subject including at least one item of clothing and having visible portions of skin. The display article includes a back panel and a display photograph. The back panel defines a flat surface. The display photograph depicts an edited version of the original photograph such that the visible portions of skin depicted in the display photograph is configured to imitate a general appearance of a mannequin. The display photograph is disposed on the flat surface of the back panel. The display photograph and the back panel are collectively cut about the perimeter of the subject. Retail display systems and methods of construction provide additional advantages.

35 Claims, 12 Drawing Sheets

U.S. PATENT DOCUMENTS

| | | | |
|---|---|---|---|
| 5,495,568 | A | 2/1996 | Beavin |
| 5,530,652 | A | 6/1996 | Croyle et al. |
| 5,573,150 | A | 11/1996 | Trujillo |
| 5,606,816 | A * | 3/1997 | Schwartz ............... 40/617 |
| 5,695,346 | A | 12/1997 | Sekiguchi et al. |
| 5,745,666 | A | 4/1998 | Gilley et al. |
| 5,850,222 | A | 12/1998 | Cone |
| D414,815 | S | 10/1999 | McDonald |
| 6,038,797 | A | 3/2000 | Smith |
| D434,081 | S | 11/2000 | Gruber |
| 6,144,388 | A | 11/2000 | Bornstein |
| 6,182,795 | B1 * | 2/2001 | Boerer ............... 186/52 |
| 6,310,627 | B1 | 10/2001 | Sakaguchi |
| 6,338,215 | B1 | 1/2002 | Vincent |
| 6,379,765 | B1 * | 4/2002 | Woods ............... 428/40.1 |
| D457,919 | S | 5/2002 | Whittier et al. |
| 6,404,426 | B1 | 6/2002 | Weaver |
| 6,418,879 | B1 | 7/2002 | Reiman |
| D462,999 | S | 9/2002 | Evans et al. |
| 6,546,309 | B1 | 4/2003 | Gazzuolo |
| 6,553,699 | B2 | 4/2003 | Edmunds et al. |
| D478,123 | S | 8/2003 | Marshall |
| 6,654,046 | B2 | 11/2003 | Eccleshall |
| 6,688,940 | B2 | 2/2004 | Stanier |
| 6,820,853 | B1 * | 11/2004 | DuBarry ............... 248/489 |
| 2001/0026272 | A1 | 10/2001 | Feld et al. |
| 2002/0004763 | A1 | 1/2002 | Lam |
| 2002/0021297 | A1 | 2/2002 | Weaver |
| 2002/0099560 | A1 | 7/2002 | Enfield |
| 2002/0117775 | A1 | 8/2002 | Tarabula |
| 2002/0178061 | A1 | 11/2002 | Lam |
| 2003/0110099 | A1 | 6/2003 | Trajkovic et al. |
| 2004/0105718 | A1 | 6/2004 | Talaric et al. |
| 2004/0148833 | A1 | 8/2004 | Virvo |

OTHER PUBLICATIONS

"Development of a 3D Cad System for the Garment Industry," <http://www.cadcam.ust.hk/research/garment/3d-cad/>.

"eLifesize, The No. 1 Choice for Lifesize Standups Online!" <http://www.elifesize.com/>.

"Flat Mannequins Forms and Display Hangers," <http://www.valuefixtures.ab.ca/bend/flat_mannequins_forms_pg2.htm>.

"Full-Color Holograms, with up to Five Seconds of Actual Motion," <http://www.litholographics.com/products/products.htm>.

"Holography 101," <http://www.litholographics.com/technology.htm>.

"Lifesize Celebrity Cardboard Cutouts," <http://www.cardboardcutouts.com/>.

"Male Flat Mannequin," http://www.thefixturezone.com/malflatman2.html.

Hajewski, "Country Store doing well—Reiman builds successful retail business through catalog sales," <http://www.jsonline.com/bym/news/apr01/hajeco118041701a.asp>, Apr. 2001.

"3D Property Visualization," <http://www.notcon-internet.co.uk/3d_visualisations.htm>.

Chang, "Holograms Go Futuristic," <http://www.findarticles.com/cf_dls/m1590/9_55/55183062/print.jhtml>, Feb. 1999.

"Three-dimensional Analysis and Reconstruction of Paintings," <http://www.eng.ox.ac.uk/World/Research/Frontpage/2000-04/story.html>, Apr. 2000.

* cited by examiner

RETAIL DISPLAY ARTICLE AND SYSTEM

BACKGROUND OF THE INVENTION

Retail businesses typically use a wide variety of display systems and articles to draw consumer attention to the products being sold. The display systems help the consumer envision how the product will look when worn, used, assembled, etc. Conventional display systems often incorporate the product itself to help the consumer envision use or wear of the product. For example, in the clothing sector, clothing is typically displayed on a three-dimensional mannequin in order to generally demonstrate the fit and cut of the clothing. Such display systems highlight particular products to possible consumers to increase the probability that a particular consumer will purchase the product.

SUMMARY OF THE INVENTION

One aspect of the present invention relates to a retail display article based upon an original photograph of a subject including at least one item of clothing and having visible portions of skin. The display article includes a back panel and a display photograph. The back panel defines a flat surface. The display photograph depicts an edited version of the original photograph such that the visible portions of skin depicted in the display photograph is configured to imitate a general appearance of a mannequin. The display photograph is disposed on the flat surface of the back panel. The display photograph and the back panel are collectively cut about the perimeter of the subject. Other features and advantages are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
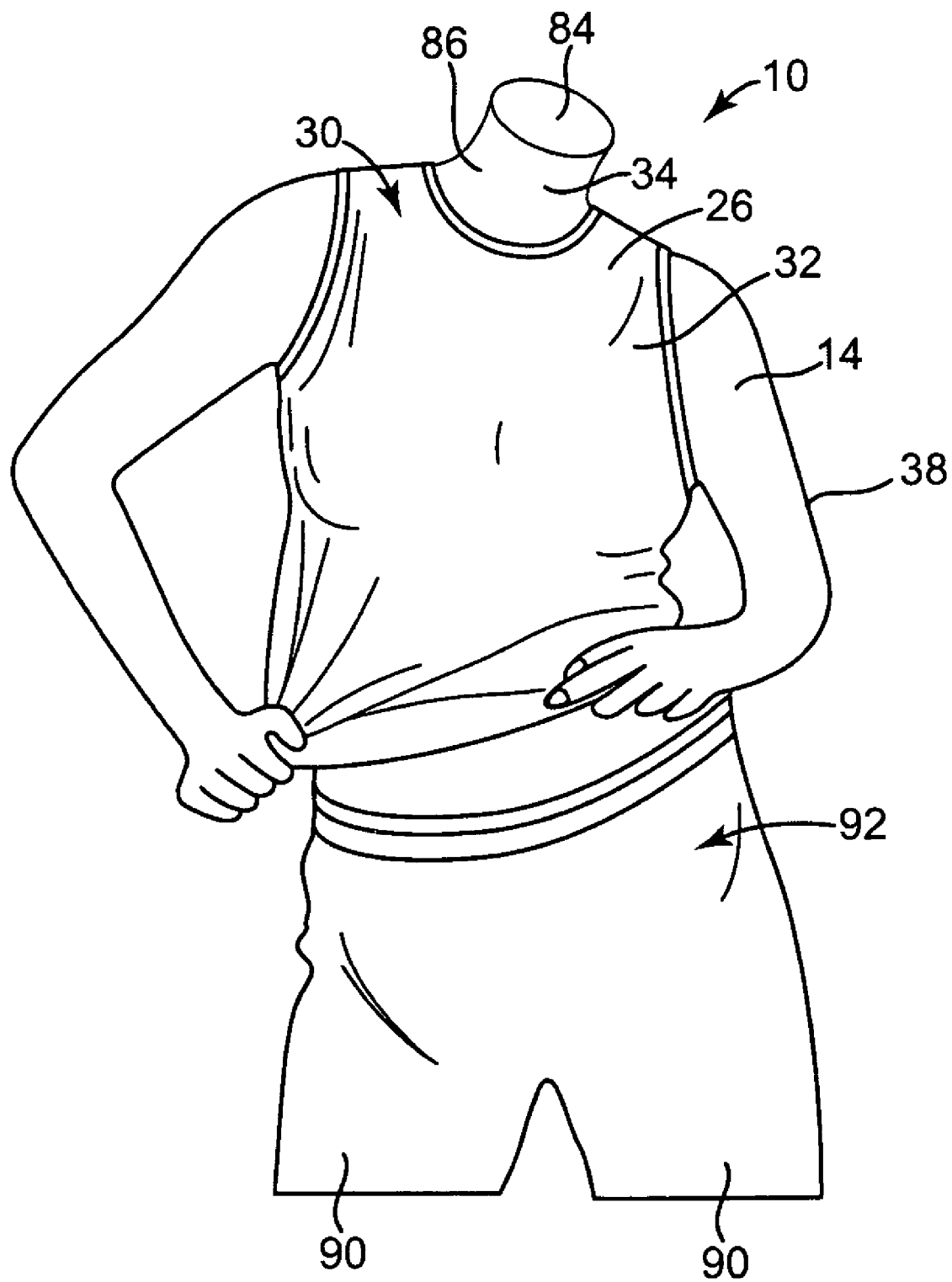
FIG. 1 is a front view of one embodiment of a retail display article, according to the present invention.
Figure 2:
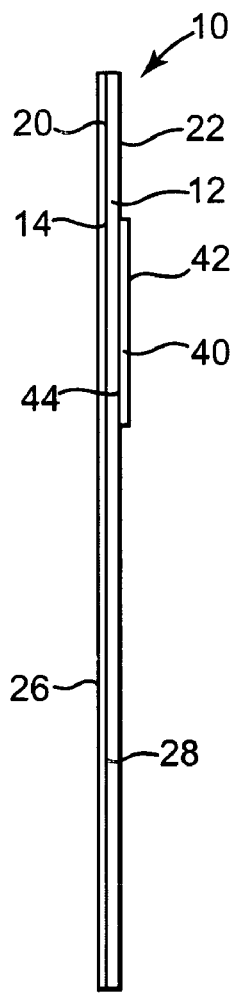
FIG. 2 is a side view of the retail display article of FIG. 1.
Figure 3:
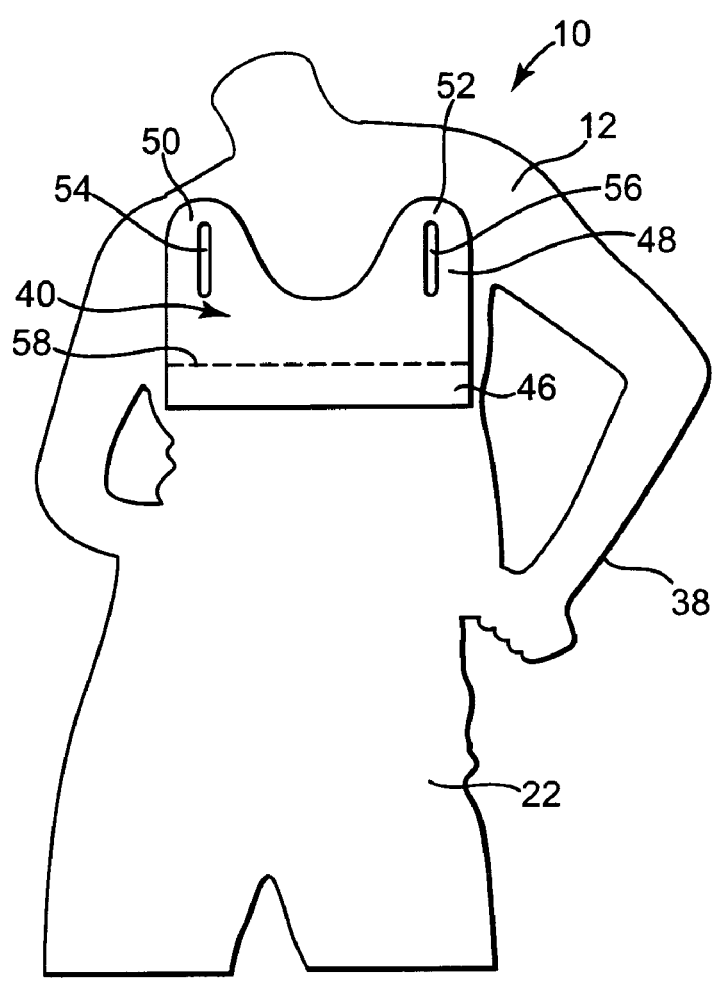
FIG. 3 is a back view of the retail display article of FIG. 1.

One embodiment of a two-dimensional retail display article 10, according to the present invention, is generally illustrated in the various views of FIGS. 1-3. Retail display article 10 provides a relatively inexpensive and lightweight manner of depicting products, such as clothing, to a consumer. Display article 10 exhibits clothing products in a manner illustrating overall fit of the product similar to conventional three-dimensional mannequins. However, display article 10 is relatively inexpensive, lightweight, and sturdy as compared to the conventional three-dimensional mannequin. Moreover, a method of constructing retail display articles 10 provides for flexibility in the presentation of the product to suit various design considerations and to align with general principles of overall store aesthetics.

Retail display article 10 includes a back panel 12, and a photograph 14. Photograph 14 depicts one or more products or goods being sold by a retail or other commercial establishment. Photograph 14 is applied to back panel 12 to provide a rigid retail display article 10 for placement within the retail establishment. Accordingly, retail display article 10 is prepared for display in a retail establishment to assist a consumer in locating a product in visualizing the product during use, and to generally enhance display of the product for sale.

Back panel 12 is a generally rigid material for receiving photograph 14. In one embodiment, back panel 12 is formed of a two-dimensional material such as foam core, paperboard, cardboard, plastic, etc. providing overall rigidity to display article 10. Accordingly, back panel 12 includes a front, generally planar surface 20 and a back surface 22 opposite front surface 20. A thickness is defined between surfaces 20 and 22 sufficient to provide overall rigidity of display article 10 to decrease folding or wilting of display article 10 when hung in a retail environment. In one embodiment, back panel 12 is a ¼ inch piece of foam core.

Photograph 14 is two-dimensional and generally planar and, accordingly, defines a front surface 26 and a back surface 28 opposite front surface 26. Photograph 14 depicts a subject 30 including a product 32 offered for sale by the retail establishment. With this in mind, photograph 14 is an example of means for depicting a product. In one embodiment, subject 30 includes a model 34 wearing or holding product 32. More specifically, in one embodiment, in which product 32 is clothing and model 34 is wearing clothing 32, photograph 14 is digitally edited to decrease the appearance of distractions that take away from product 32. In particular, model 34 includes skin or flesh 36 exposed at various spots around clothing 32. In one embodiment, skin 36 is digitally altered to present a more neutralized and smooth appearance to imitate the general appearance of a conventional three-dimensional mannequin, as will be described in greater detail below.

Back surface 28 of edited photograph 14 is secured to front surface 20 of back panel 12. In one embodiment, photograph 14 is mounted to back panel 12 with an adhesive, tape, or other securing product. Accordingly, back panel 12 is an example of means for strengthening photograph 14. Photograph 14 and back panel 12 are simultaneously cut into the desired end shape of display article 10. In one example, photograph 14 and back panel 12 are cut about a perimeter 38 of subject 30.

A mounting bracket or device 40 is secured to back surface 22 of back panel 12. Mounting bracket 40 is die-cut from cardboard, foam core, or other two-dimensional and generally rigid material. In one embodiment, mounting bracket 40 is die-cut from a 24 point chip board material. Mounting bracket 40 defines a first, generally planar surface 42 and a second surface 44 opposite first surface 42. Mounting bracket 40 defines a mounting portion 46 and a hanger interface portion 48 extending from mounting portion 46.

In one embodiment, mounting portion 46 is generally rectangular and configured to be secured directly to back surface 22 of back panel 12. Hanger interface portion 48 defines two protrusions or humps 50 and 52 laterally spaced from each other and each extending from mounting portion 46 to generally define mounting bracket 40 as an M-shaped bracket. In one embodiment, each protrusion 50 and 52 extends from mounting portion 46 in a generally perpendicular and upward manner. Apertures 54 and 56 are, respectively, defined near the top of each protrusion 50 and 52, i.e. opposite mounting portion 46.

In one embodiment, mounting bracket 40 includes a perforated line or demarcation 58 extending laterally on mounting bracket 40 between mounting portion 46 and hanger interface portion 48. Accordingly, mounting bracket 40 is mounted to back panel 12 by securing second surface 44 of mounting tab 46 to back surface 22 of back panel 12. In one embodiment, mounting bracket 40 is secured to back panel 12 via double stick tape or other adhesive capable of securing mounting bracket 40 to back panel 12. Hanger interface portion 48 with protrusions 50 and 52 is able to bend or slightly rotate about perforated line 58 to alter the otherwise generally planar cross-section of mounting bracket 40.

Figure 4:
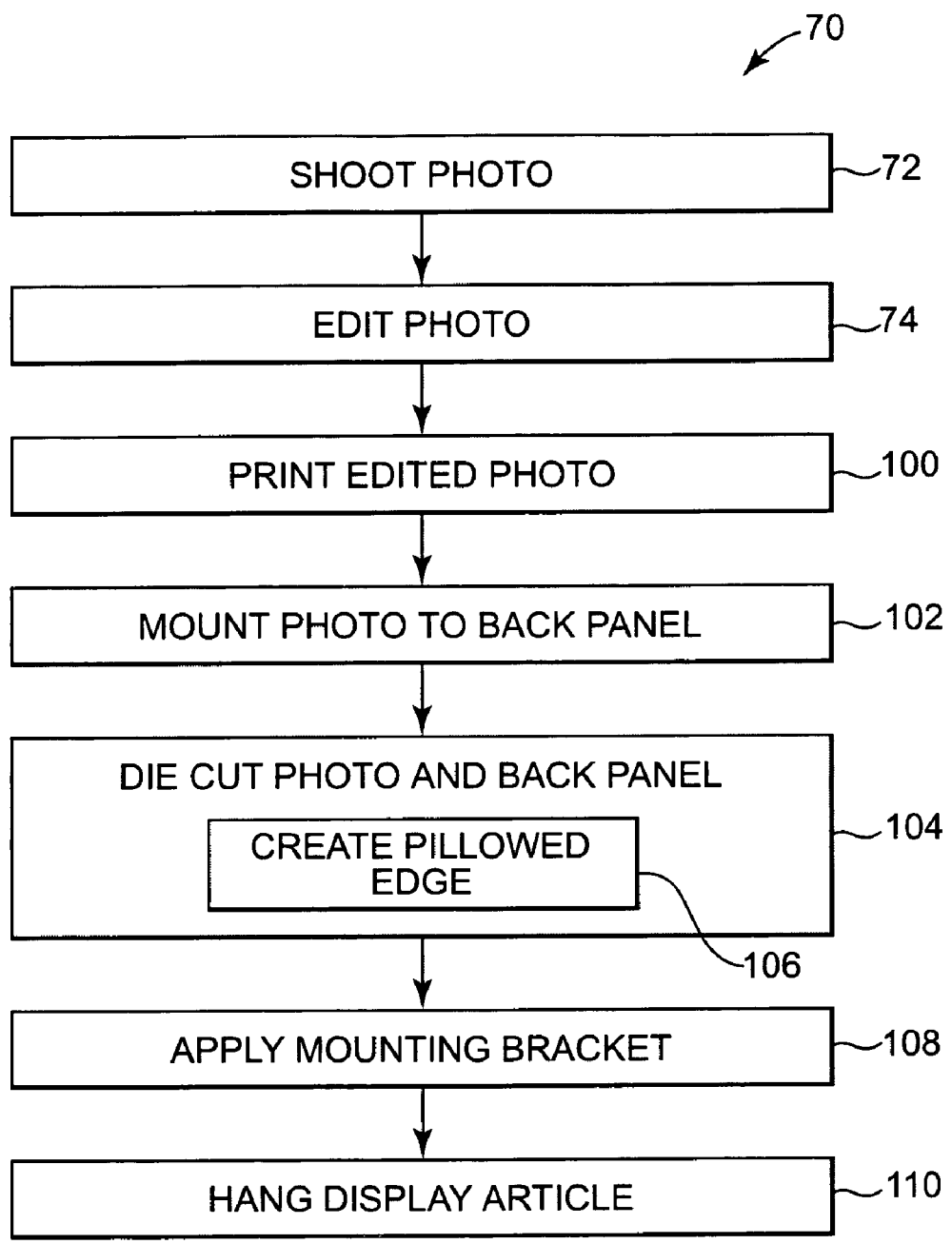
FIG. 4 is a flow chart of a process of constructing the retail display article of FIGS. 1-3, according to an embodiment of the present invention.

One embodiment of a process of constructing retail display article 10, according to the present invention, is generally illustrated at 70 in FIG. 4. At 72, photograph 14 is shot or captured to depict subject 30, which as described above, includes product 32 being offered for sale. In one example in which photograph 14 includes model 34 wearing clothing product 32 offered for sale, photograph 14 is shot or captured during a photograph session capturing model 34 and clothing product 32 for use in a catalog or online catalog display relating to the retail establishment. During shooting of photograph 14 at 72, model 34 preferably poses in multiple mannequin-like poses selected to enhance display clothing product 32 one of which will be selected for end-use as part of display article 10.

Figure 5:
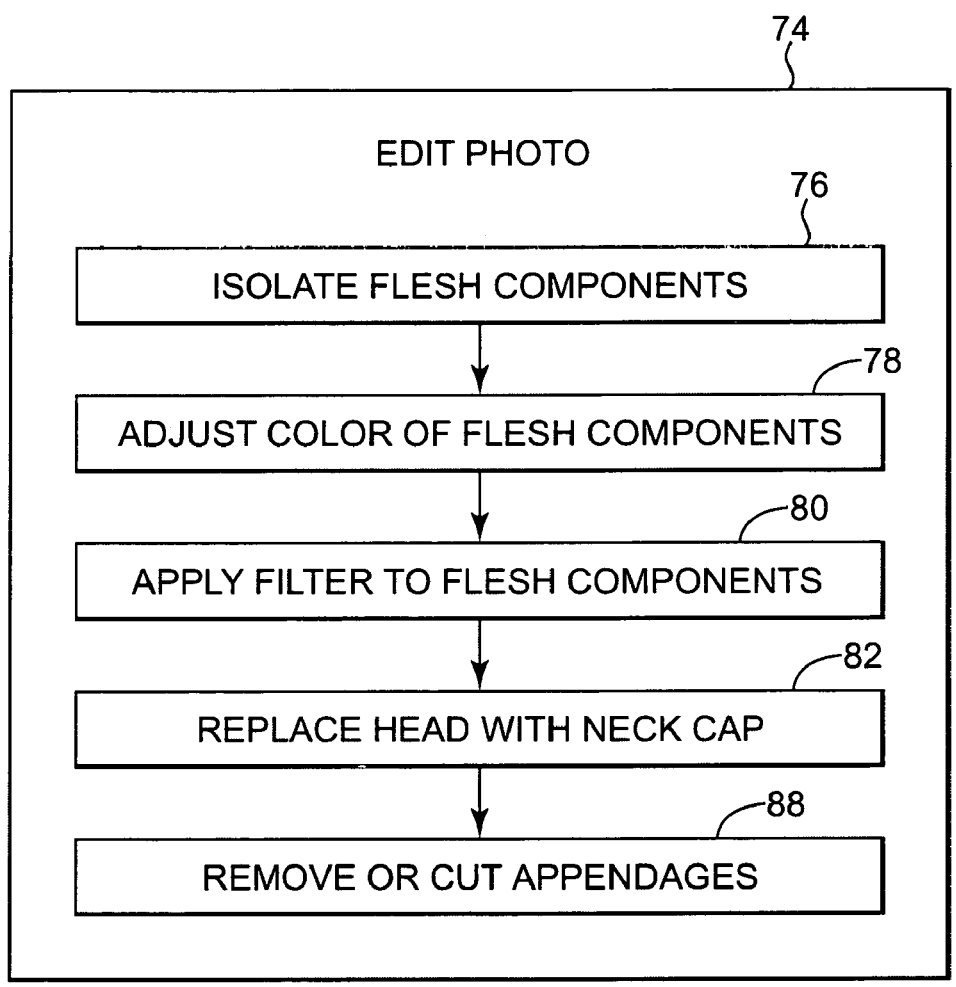
FIG. 5 is a flow chart of one embodiment of a step in the process of constructing the retail display article of FIG. 4, according to the present invention.

At 74, photograph 14 is digitally edited to draw attention to clothing product 32 or to at least to reduce characteristics of photograph 14 that distract from clothing product 32. More specifically, in one embodiment, photograph 14 is altered such that the general appearance of altered model 34 imitates the general appearance of a mannequin. For example, as illustrated in FIG. 5, in one embodiment, editing photograph 74 includes isolating flesh components at 76. Isolating flesh components includes digitally editing photograph 14 to select and isolate portions of subject 30 in which flesh or skin 36 of model 34 is showing, i.e. flesh 36 is not covered by clothing 32.

Following isolation of the flesh components, then at 78 the color of the isolated flesh components is altered. In one embodiment, flesh components are altered by selecting a neutral color, such as white, beige, or black to serve as the flesh color. By adjusting the color of the flesh to be white, beige, or black, the flesh 36 of model 34 appears similar to a three-dimensional modern mannequin. In other embodiments, flesh 36 is digitally altered to be any solid color or pattern designed to align with an overall aesthetic plan of the retail establishment.

At 80, a digital filter is applied to the flesh components. The digital filter allows imperfections in flesh 36 of model 34, such as age spots, hair, etc., to be removed from or have their severity decreased on flesh 36 to provide a more smooth and overall consistent complexion to the flesh components. In one embodiment, at least some of the moles, excess wrinkles, skin folds, and hair is removed from model 34. The degree to which the digital filter is applied to photograph 14 is subjective and to be determined by the designer based upon the overall desired effect of display article 10. In particular, although in one embodiment, all hair and body imperfections or individualized demarcations may be removed from flesh 36 of model 34, in other embodiments, a lesser percentage of the imperfections, demarcations, hair, etc. are removed from model 34 in order to continue to provide a three-dimensional look to model 34. In one embodiment about 25-50% of skin creases appearing in the flesh components are removed.

At 82, a head of model 34 is replaced with a neck cap 84. The head of model 34 is first deleted; more particularly, the head and at least a portion of a neck 86 of model 34 are deleted. A neck cap 84 is placed on top of the neck in place of the deleted head and neck portion. With this in mind, neck cap 84 simply caps off or tops a top or mid portion of model neck 86 to provide a clean line similar to that of a conventional mannequin without a head. Preferably, neck cap 84 is designed to further a three-dimensional visual illusion. By removing the head of model 34 in photograph 14, model 34 is less defined as an individual and, thereby, is less distracting to customers to maintain the focus of photograph 14 on clothing 32 being offered for sale.

At 88, other appendages or portions of model 34 that are not desired to be included in display article 10 are digitally deleted. In particular, as illustrated in the embodiment of FIG. 1, the lower portion of legs 90 of model 34 are removed. In other instances, legs and arms, arms, portions of the torso, or other portions of body 92 can be removed as desired. Notably, the steps of editing photograph 74 as illustrated in FIG. 5 represent merely one example of order and inclusion. In one embodiment, only one of the editing photographs steps 76-82 and 88 are performed on photograph 14. A predominant number of editing steps taking place on photograph 14 are applied to flesh 36 or other components of subject 30 not including clothing or product 32. Accordingly, clothing or product 32 is shown in a relatively realistic manner similar to as it would appear during actual use or wear by a consumer. With this in mind, each step 76, 78, 80, 82 performed while maintaining a sufficient portion of shading of subject 30 that indicates dimension and/or maintaining clothing or product 32 with a dimensional appearance similar to that originally photographed is an example means for providing display article 10 with a three-dimensional appearance. Moreover, editing photograph 14 at each of steps 76, 78, 80, 82, and 88 creates features of subject 30 to imitate the general appearance of a mannequin displaying clothing or product 32.

Referring again to FIG. 4, once photograph 14 has been edited to a degree satisfying the designer of display article 10, then at 100 edited photograph 14 is printed on a print media, such as paper, cardstock, velum, transparency, etc. In a preferred embodiment, photograph 14 is printed on lithograph paper. At 102, printed photograph 14 is mounted to back panel 12. More specifically, back surface 28 of photograph 14 is secured to front surface 20 of back panel 12.

In one embodiment, photograph 14 is mounted to back panel 12 via adhesive, tape, glue, or other securing product. Preferably, the securing product used to secure photograph 14 to back panel 12 secures photograph 14 in a smooth and flat manner on back panel 12.

At 104, photograph 14 and back panel 12 are simultaneously cut about perimeter 38 of subject 30. In particular, back panel 12 and photograph 14 are cut about subject perimeter 38 extending about model 34 and clothing 32 to remove any unnecessary or undesired background from the photograph 14. Photograph 14 and back panel 12 are cut about the outer perimeter of model 34 and clothing product 32. Cutting about subject perimeter 38 includes cutting out interior background portions from photograph 14, such as background portions framed between a bent arm and model torso as illustrated in FIG. 1. In one example, back panel 12 and photograph 14 are cut in a die cut process.

In one embodiment, die cutting of photograph 14 and back panel 12 includes creating a pillowed edge at 106. More specifically, a pillowed edge is created about subject perimeter 38 by slightly flattening and rolling the front edges of the display article 10, including the front edges of back panel 12 and photograph 14, towards back surface 22 of back panel 12. Accordingly, the pillowed edge presents the front edges of display article 10 transitioning backwards in a relatively smooth manner. By creating the rolled or pillowed edge about perimeter 38 of display article 10, the three-dimensional appearance of display article 10 is further enhanced and a smooth edge is presented.

At 108, mounting bracket 40 is applied to display article 10. As described briefly above, mounting portion 46 of mounting bracket 40 is secured to back surface 22 of back panel 12 with double-stick tape or other adhesive. Positioning of mounting bracket 40 upon back surface 22 of back panel 12 is determined based on design configurations and is at least partially dependent upon the position in which display article 10 will be orientated during display and hanging within the retail establishment. For example, the orientation of mounting bracket 40 with respect to photograph 14 is dependent upon whether or not the display article 10 will be oriented to show photograph 14 in a reclined or lay-down position versus a stand-up or sitting position. In addition, mounting bracket 40 may be positioned higher or lower on display article 10 such that upon hanging within the retail establishment, the display article 10 will be hung at a desired elevation level. Once mounting portion 46 is secured to back surface 22 of back panel 12, hanger interface portion 48 can be rotated or bent about perforated line 58 to space hanger interface portion 48 from back surface 22 of back panel 12.

Figure 6:
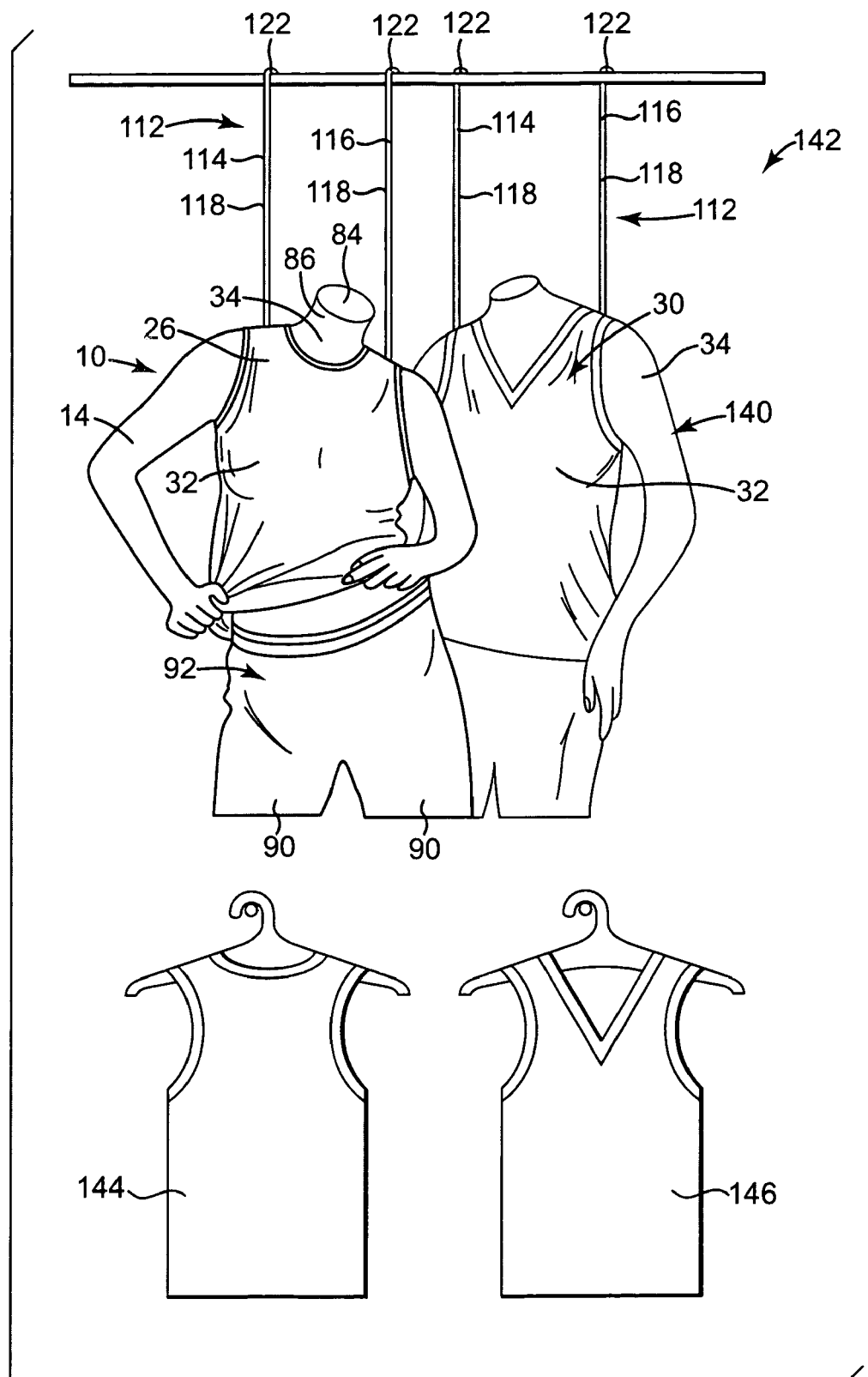
FIG. 6 is a front view illustrating one embodiment of a product display including the retail display article of FIG. 1, according to the present invention.
Figure 7:
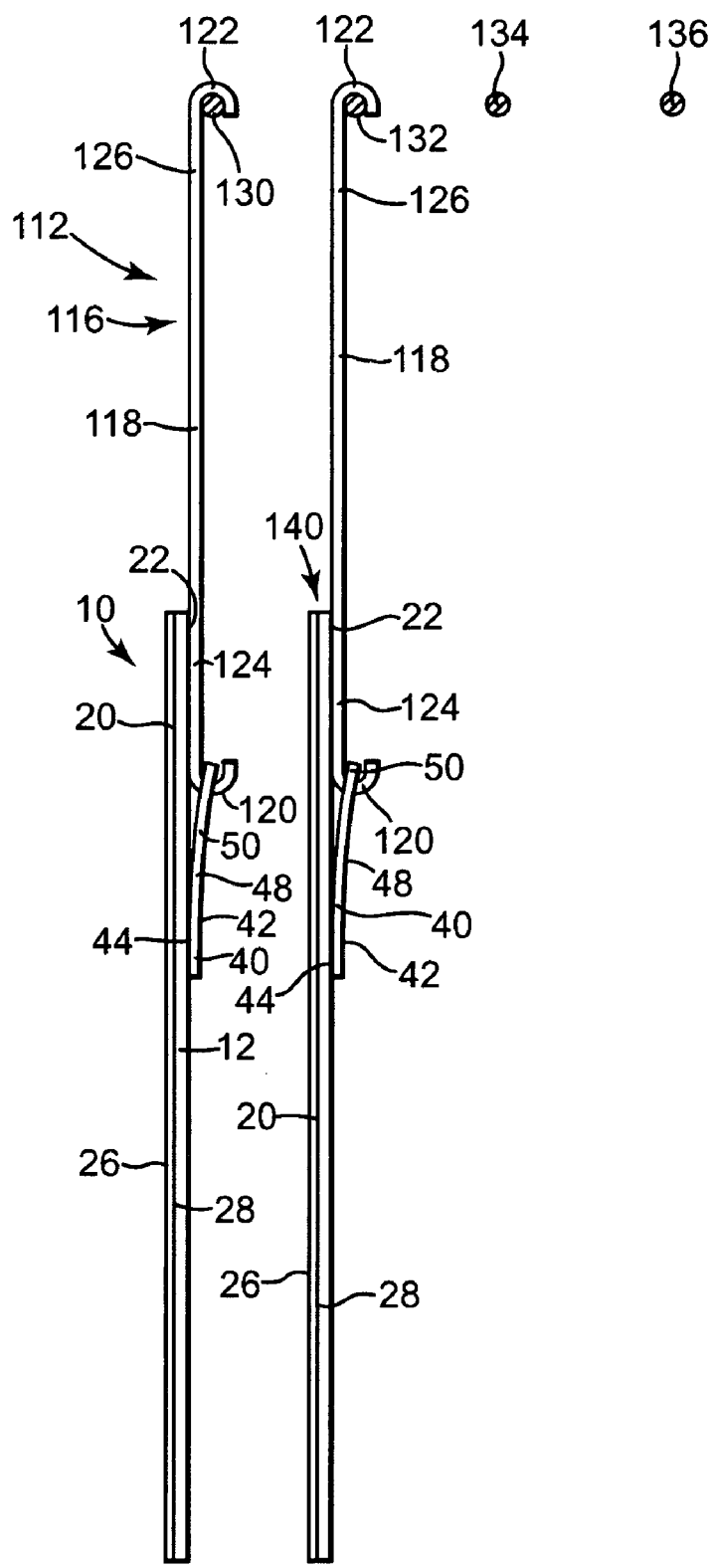
FIG. 7 is a side view of the product display of FIG. 6.

With this in mind, at 110, display article 10 is hung or placed within the retail establishment. Referring to the front view of FIG. 6 and related side view of FIG. 7, display article 10 is hung with a hanger 112. In one embodiment, hanger 112 includes a first member 114 and a second member 116. Each of first member 114 and second member 116 defines an elongated portion 118, a bottom hook 120, and top hook 122. Elongated portion 118 includes a first or bottom end 124 and a second or top end 126 opposite first end 124.

Bottom hook 120 is coupled to first end 124 and top hook 122 is coupled to second end 126 of elongated portion 118. Each hook 120 and 122 curves from or extends from elongated portion 118 in similar directions to form first member 114 or second member 116 as a C-shaped member. Alternatively, each hook 120 and 122 curves from or extends from elongated portion 118 in opposite directions to form first and second members 114 and 116 as S-shaped or inverted S-shaped members. In one embodiment, elongated portion 118 is formed of steel, such as a powder-coated steel rod. Hooks 120 and 122 are integrally formed with elongated portion 118. Alternatively, at least one of hooks 120 and 122 is formed of acrylic, such as clear acrylic, coupled to elongated member 118. First and second members 114 and 116 hang independently from one another.

In order to more easily couple hanger 112 to display article 10, hanger interface portion 48 of mounting bracket 40 is rotated or bent about perforated line 58 to space protrusions 50 and 52 from back surface 22 of back panel 12. Bottom hook 120 of first member 114 is placed through aperture 54 of mounting bracket 40 to receive first protrusion 50. Similarly, bottom hook 120 of second member 116 is placed through aperture 56 to receive second protrusion 52 of mounting bracket 40. With this in mind, hanger 112 is selectively coupled with display article 10.

Accordingly, by lifting hanger 112, display article 10 is similarly lifted and maneuvered. In one embodiment, to hang display article 10, hanger 112 is positioned to interface with one of a plurality of support rods 130, 132, 134, and 136 extending horizontally above a display area. More specifically, top hooks 122 of first member 114 and second member 116 are each placed around and receive one of the support rods, in this case, support rod 130. Support rods 130, 132, 134, and 136 are often already mounted within the retail establishment for receipt of various displays including display article 10. For instance, one example arrangement of support rods is described in U.S. Design Pat. No. D457,919 to Whittier et al., which is hereby incorporated herein by reference. In one embodiment, support rods 130, 132, 134, and 136 extend generally parallel to one another. Once hanger 112 is received by support rod 130, display article 10 is hung from support rod 130 in a position for display. Accordingly, hanger 112 alone or with mounting bracket 40 are example means for collectively hanging back panel 12 and photograph 14

In one embodiment, hanging retail display 10 includes hanging a second display article 140, which is similar to display article 10 described above, to define an overall product display 142 pleasing to the eye of the consumer. In one embodiment, second display article 140 is hung adjacent to display article 10. Second display article 140 is hung on support rod 132 positioned slightly in front of or, as in this case, behind horizontal support rod 130 on which display article 10 is hung. Accordingly, second display article 140 is positioned slightly behind first display article 10. By positioning display articles 10 and 140 on two different but parallel support rods 130 and 132 and by horizontally overlapping display articles 10 and 140, the three-dimensional illusion of overall product display 142 is further enhanced.

Hanging multiple display articles 10 and 140 includes vertically positioning each of a plurality of display articles 10 and 140 with respect to one another to present a pleasing appearance to the consumer. In one embodiment, at least one body part common in each of models 34 depicted in display articles 10 and 140 are aligned. More specifically, in one embodiment, at least one of shoulders, neck, waist, knees, feet, etc. are aligned on display article 10 and display article 140 when display articles 10 and 140 are hung as part of collective product display 142. Alternatively, display articles 10 and 140 are intentionally misaligned to achieve a desired aesthetic effect. In one embodiment, the desired alignment of display articles 10 and 140 is achieved by altering the positioning of the respective mounting bracket 40 on back panel 12 of each of display articles 10 and 140. In this embodiment, different articles 10 and 140 can be hung at differing elevations while using hangers 112 all having members 114 and 116 with identical lengths.

For example, consider hanging display articles 10 and 140 so an elbow of model 34 of display article 10 aligns with shoulders of model 34 of display article 140. To achieve such an alignment, a first mounting bracket 40 is positioned higher on display article 10 relative to the position of a second mounting bracket 40 on display article 140. Accordingly, even when hanger members 114 and 116 used for display articles 10 and 140 all have the same length, each display article 10 and 140 can be hung at a different elevation based upon the placement of the respective mounting bracket 40. In other embodiments, the length of hanger members 14 and 16 varies.

Hanging display articles at 110 further includes positioning display articles 10 within the retail establishment relatively near or in proximate position to the actual goods 144 or 146 being sold to the consumer. For example, in one embodiment in which the actual goods 144 and 146 are each a different shirt available for purchase by consumers, product 32 depicted by photograph 14 of each display article 10 and 140 is shirts 144 and 146, respectively. With this in mind, display articles 10 and 140 are positioned relatively near to or in proximity with the display of actual goods 144 and 146. Accordingly, a consumer drawn to a particular area due to display articles 10 and 140 can easily find and access the actual corresponding shirts 144 and 146 for purchase.

Figure 8:
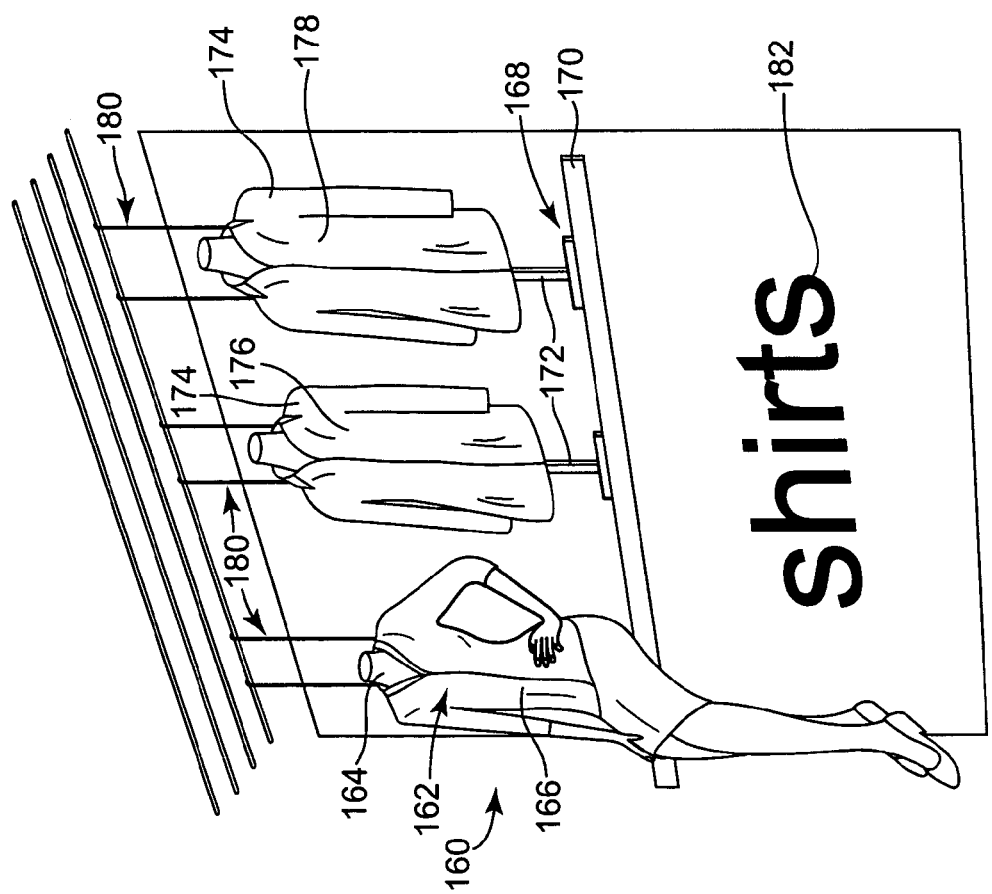
FIG. 8 is a perspective view of one embodiment of a retail display article in a retail environment, according to the present invention.

As illustrated in FIG. 8, an alternate embodiment of a retail display article 160 is similar in all respects to retail display article 10 described above except for those differences specifically enumerated herein. In particular, retail display article 160 not only depicts a subject 162, which includes a model 164 and a product 166 similar to model 34 and product 32, but also includes fixtures 168. More specifically, retail display article 160 includes fixtures 168 such as a horizontal shelf 170 and at least one rack 172. In one embodiment, a first subject 162 including a clothing product 166 is positioned to lay, sit or stand upon fixture shelf 170. In addition, each of the plurality of racks 172 is shown to sit upon fixture shelf 170 to illustrate a bust-like representation 176 or 178 of products 174 similar to product 166.

Each bust 176 or 178 is formed by photography as described with respect to photograph 14. However, the hands and legs of the respective model 164 are deleted when the photo is edited at 74. Accordingly, instead of appearing similar to a full three-dimensional mannequin, each of busts 176 and 178 appears as a three-dimensional mannequin bust placed upon one of racks 172. In construction, models to be altered to become subject 164, bust 176, or bust 178 are photographed either together or separately and placed for use in single display article 160 with digitally editing. Accordingly, another aesthetically pleasing method of display of product representations can be formed by retail display article 160.

Different combinations of fixtures 168, models 34 or 164, and products 32, 166, and 174 can be grouped in any particular collection to define a different retail display article. Depending upon the size of the retail display article 160, retail display article 160 includes one or more mounting brackets 40 and requires one or more hangers 112. In particular, with respect to retail display article 160, a plurality of mounting brackets (not shown) each similar to mounting bracket 40 and a plurality of hangers 180 each similar to hanger 112 described above, hang retail display article 160.

Also as illustrated in FIG. 8, in one embodiment, a retail display article, such as retail display article 160 may be hung in front of or beside graphical or textual indicia 182 further identifying the product for sale. Graphical or textual indicia 182 may be related to a trademark, brand name, product identifier, slogan, product type or other textual or graphical reference further drawing consumer attention to a product and/or enticing a consumer to purchase the related product displayed.

Mannequin-like display articles according the present invention present an economical yet aesthetically pleasing way to display product representations allowing a consumer to further visualize the appearance of the product during use or wear. By presenting the product in a visual manner imitating a three-dimensional display, the product can more accurately be represented to the consumer. In addition, by providing an economical way of producing the retail display articles, the retail display articles can easily be removed and replaced without the retail establishment incurring burdensome costs. Furthermore, due to the lightweight nature of the display articles, the display articles are easily hung or mounted for display in a variety of positions otherwise relatively cumbersome to produce with conventional mannequins or display fixtures. Therefore, the display articles described herein provide an aesthetically pleasing display further enhancing a consumer's shopping experience within the retail establishment.

Yet another embodiment of a retail display system 200 is illustrated in FIGS. 9-13. Retail display 200 includes a plurality of two-dimensional display panels or articles, such as 204, 206, and 208, hung in front of a wall 202 of the retail establishment. Each panel 204, 206, and 208 is formed by a back panel 210 and a photograph or other representation 212 mounted onto back panel 210. In one embodiment, back panel 210 is formed of any material similar to back panel 12 of retail display article 10.

Photograph or representation 212 includes a product offered for sale, or other graphical or textural indicia relating to the sale of product at the retail establishment. For example, retail display article 204 illustrated in FIG. 9 includes photograph 212 of a model 214 wearing a product 216, in this case, sunglasses, and a background 218 behind model 214. Photograph 212 can be a photograph directly captured during a photo session. Alternatively, photo 212 is digitally edited and altered to arrive at the desired visual effect. In one embodiment, model 214 and product 216 are digitally cut from their original photograph background and placed upon a digitally created, altered, or enhanced background 218.

Retail display article 206 displays a product 220 offered for sale by the retail establishment as well as indicia 222 and a background 224. In one embodiment, product 220 is identical to or related to product 216 illustrated in retail display article 204. Indicia 222 may be graphical or textural and relates to one of a trademark, brand name, product identifier, slogan, product type, or other textural or graphical reference further drawing consumer attention to retail display system 200. Background 224 may be a background photographed during a photo session or a background added during digital enhancement or editing of photograph 212 of panel 206. In one embodiment, both background 224 and indicia 222 are added during the digital enhancement and editing process.

The attributes of separate retail display articles 204, 206, and 208 can be interchangeably intertwined or intermixed to define the images displayed in a cohesive manner corresponding with an overall scheme or look for retail display system 200. In one embodiment, in order to link the look of retail display articles 204, 206, and 208 together, the respective backgrounds 218, 224, and 226 are similar or part of a collective pattern to collectively link the images displayed by the retail display articles 204, 206, and 208.

Each retail display article 204, 206, and 208 includes a pair of mounting brackets 230 mounted to back panel 210 opposite photograph 212. Mounting brackets 230 are similar to mounting brackets 40 described above, however, in one embodiment, mounting brackets 230 include a single protrusion or hump 231 extending from a mounting portion 46. Each mounting portion 46 again includes an aperture for receiving a hanger member 232. In one embodiment, each hanger member 232 is similar to first and second members 114 and 116 of hanger 112 described above. Accordingly, each retail display article 204, 206, and 208 is hung upon a support rod 130, 132, 134, or 136 by a hanger 234 including two hanger members 232. In particular, in one embodiment, retail display article 204 is hung by a hanger 234 from support rod 134 and retail display article 206 is hung by a hanger 234 from support rod 136 which is positioned between support rod 134 and retail establishment wall 202. Accordingly, retail display articles 204 and 206 are not longitudinally aligned with one another but rather extend parallel with one another. Accordingly, retail display articles 204, 206, and 208 are hung in a three-dimensional fashion.

Figure 12:
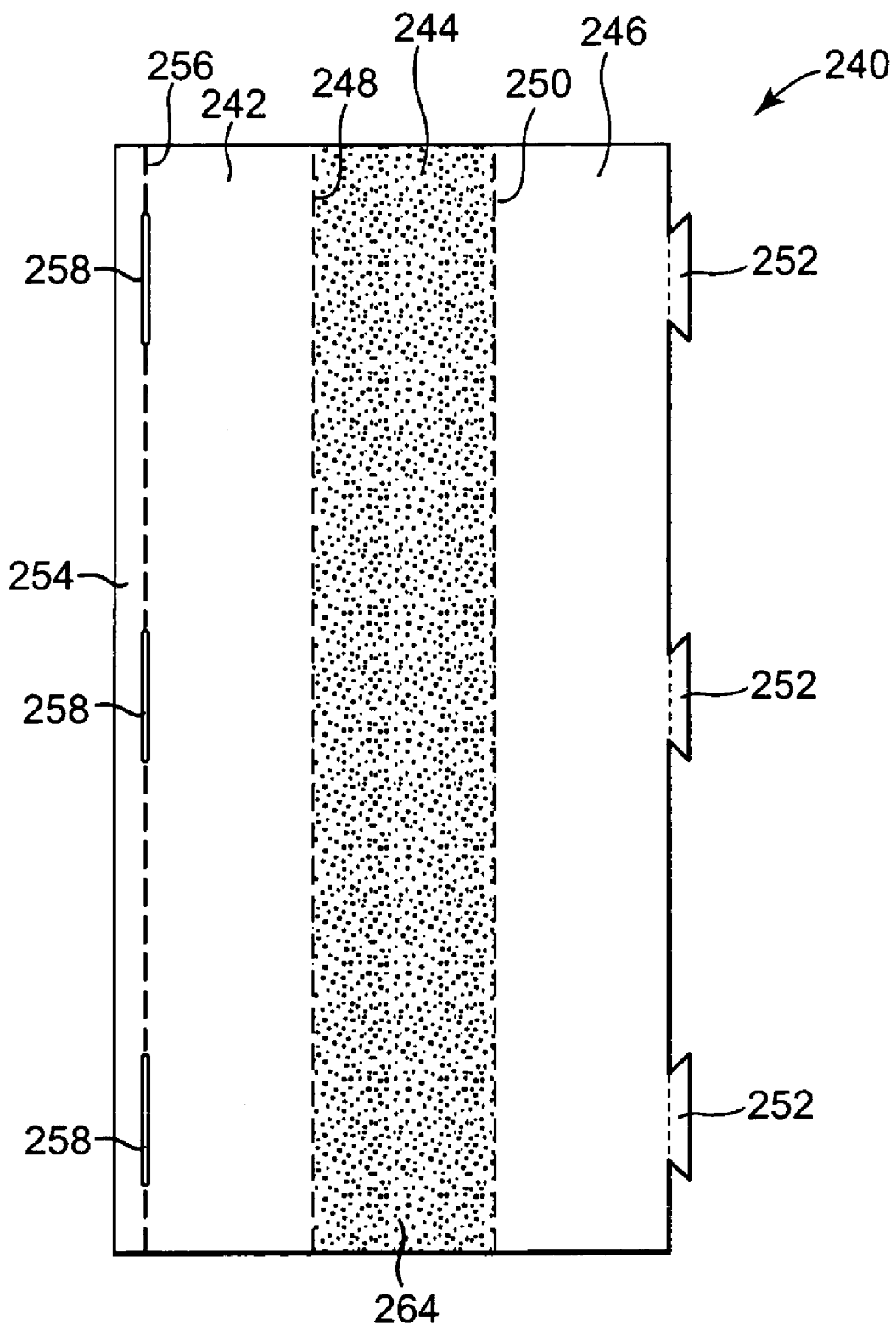
FIG. 12 is a front view illustrating a spacer of the retail display of FIG. 10, according to an embodiment of the present invention.

In order to further the three-dimensional appearance of retail display system 200, triangle spacers 240 are integrated within system 200. As illustrated in FIG. 12, each triangular spacer 240 is formed from a two-dimensional piece of material, such as foam core, paperboard, cardboard, plastic, etc. with sufficient overall rigidity to facilitate spacing of a retail display article 204, 206, or 208 from retail establishment wall 202. More specifically, triangular spacer 240 is die-cut from the two-dimensional material. In a specific embodiment, triangular spacer 240 includes a first panel 242, a second panel 244, and third panel 246. Second panel 244 extends from first panel 242 towards second panel 246. Third panel 246 extends from second panel 244 opposite first panel 242.

First panel 242 is differentiated from second panel 244 by a line of perforation or demarcation 248 extending there between. Similarly, a perforated line or line of demarcation 250 extends between second panel 244 and third panel 246. At least one tab 252 extends from third panel 246 opposite the extension of second panel 244. A flange 254 extends along an entire length of first panel 242 opposite second panel 244. Flange 254 is separated from first panel 242 by a line of demarcation or perforation 256. At least one slot 258 is formed along perforated line 256 and is sized to receive the at least one tab 252. Accordingly, upon folding triangular spacer 240 along each of the perforated lines 248, 250, and 256 and placing each of the at least on tabs 252 within the respective at least one slot 258, the once two-dimensional triangular spacer 240 becomes a three-dimensional triangular pacer 240. With this in mind, although three-dimensional during use, triangular spacer 240 can be stored and shipped in a flat manner before use or unfolded to be stored and shipped in a flat manner after use.

Figure 10:
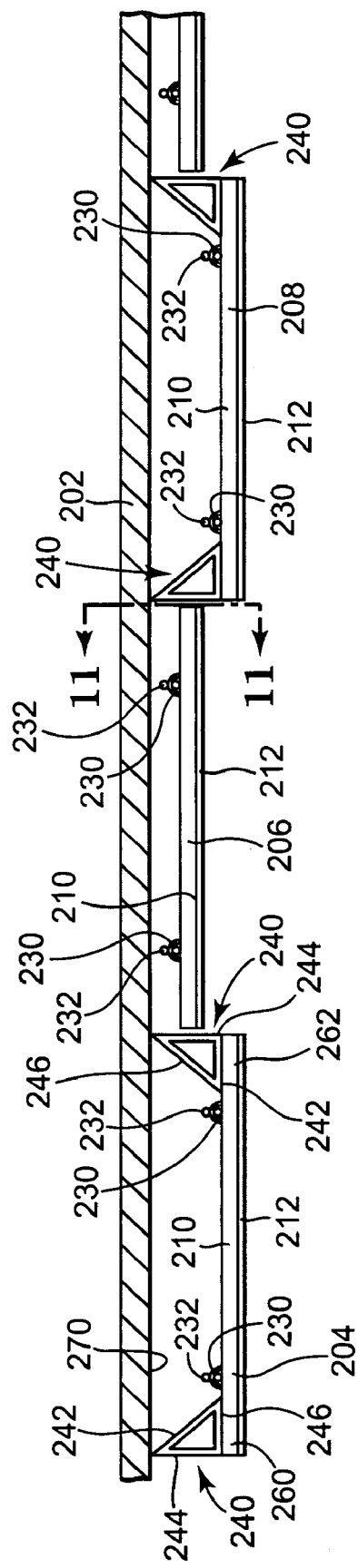
FIG. 10 is a cross-sectional view of one embodiment of the retail display article of FIG. 9 taken along the line 10-10.
Figure 11:
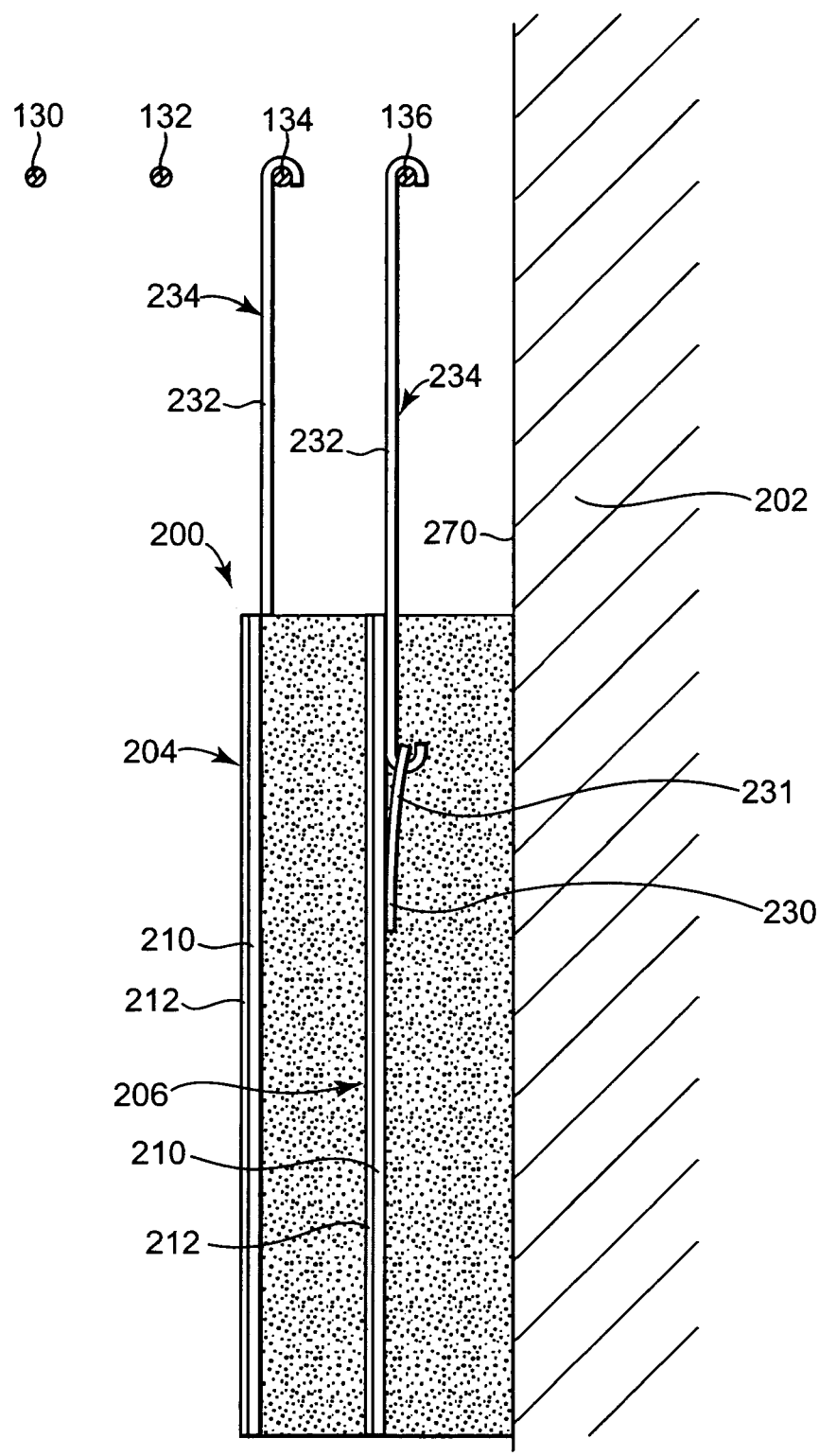
FIG. 11 is a cross-sectional view of the retail display of FIG. 10 taken along the line 11-11.

As illustrated in FIG. 10, triangular spacer 240 is coupled with retail display article 204. In particular, a first triangular spacer 240 is coupled with a left end 260 of retail display article 204 by coupling third panel 246 of triangular spacer 240 to back panel 210 opposite photograph 212. In one embodiment, third panel 246 of triangular spacer 240 is coupled with back panel 210 with double-stick adhesive tape or other adhesive known in the art. A second triangular spacer 240 is coupled with the right end 262 of retail display article 204 in a similar but opposing manner. With this in mind, first panel 242 of second triangular spacer 240 is coupled with back panel 210 near right end 262 of retail display article 204. Accordingly, second panel 244 of the respective triangular spacer 240 is visible when viewed from a side of retail display article 204. In one embodiment, second panel 244 of triangular spacer 240 includes a photograph or printing of a background 264 similar to or continuing a similar pattern as shown by backgrounds 218, 224, and 226 of retail display articles 204, 206, and 208. Accordingly, when viewed from multiple angles, retail display system 200 presents a continuous and cohesive background pattern.

In one embodiment, retail display articles, such as retail display article 206 hung on support rod 136 closest to retail establishment wall 202, do not include a triangular spacer 240. In other embodiments in which retail display articles are hung from rods 130 or 132, which are further away from retail establishment wall 202, similar but larger triangular spacers 240 are incorporated.

In a preferred embodiment, each triangular spacer 240 is sized such that triangular spacer 240 extends from retail display article 204 to interface with a front surface 270 of retail establishment wall 202. More specifically, second panel 244 of triangular spacer 240 has a width between first panel 242 and third panel 246 equal to the distance between back panel 210 of retail display article 212 and front surface 270 of retail establishment wall 202. In this manner, an illusion is presented to consumers and passersby that retail display article 204 actually extends from wall 202. In one embodiment in which alternating retail display articles 204 and 210 are hung from a support wall rod 134 and incorporate triangular spacers 240 sandwich retail display articles such as 206, collective display system 200 presents display articles 204, 206, and 208 as a continuous three-dimensional display.

Figure 13:
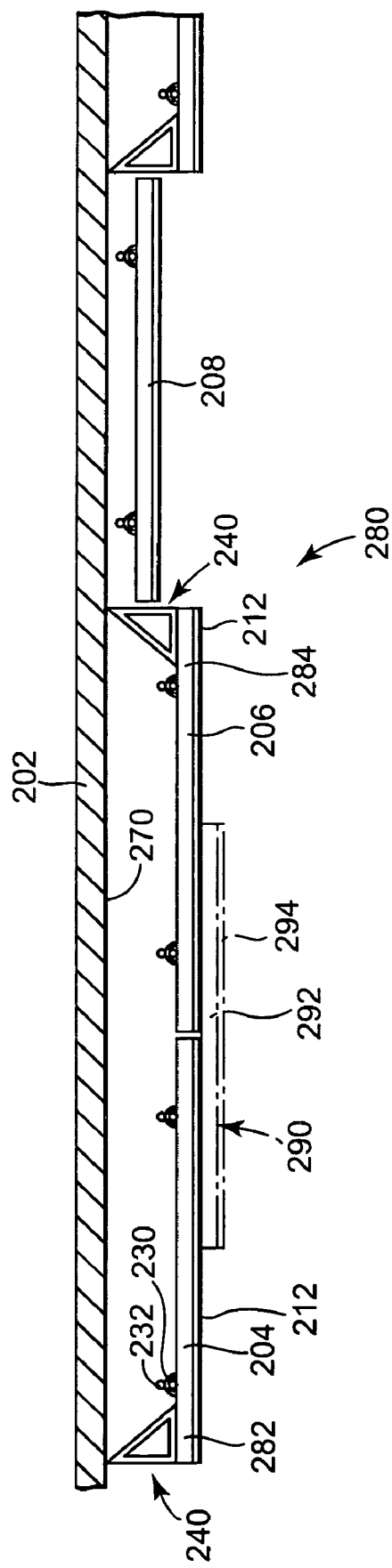
FIG. 13 is a cross-sectional view of an embodiment of the retail display article of FIG. 9 taken along the line 10-10.

FIG. 13 illustrates an alternative alignment of retail display articles 204, 206, and 208 generally at 280. In this embodiment, retail display panels 204 and 206 are hung off the same horizontal support rod 134, and retail display article 208 is hung from support rod 136 positioned between support rod 134 and retail establishment wall 202. In this embodiment, triangular spacers 240 are only positioned near a left end 282 of retail display article 204 and a right end 284 of retail display article 206 to continue the three-dimensional illusion. In one embodiment, retail display article 204 is secured to retail display article 206 at their intersection with adhesive or double-sided adhesive tape. Accordingly, retail display articles 204 and 206 are hung with a similar extension from retail establishment wall 202 and, in some embodiments, appear to consumers or passersby as a collective and cohesive retail display.

In one embodiment, triangular spacers 240 are not included in the interior portions of retail display articles 204 and 206 since any such triangular spacers would not be visible to consumers or passersby. More generally stated, in one embodiment, triangular spacers 240 are positioned to enhance the three-dimensional illusion to consumers or passersby, and therefore are only placed where the consumers or passersby can view the triangular spacers at a given angle.

Figure 9:
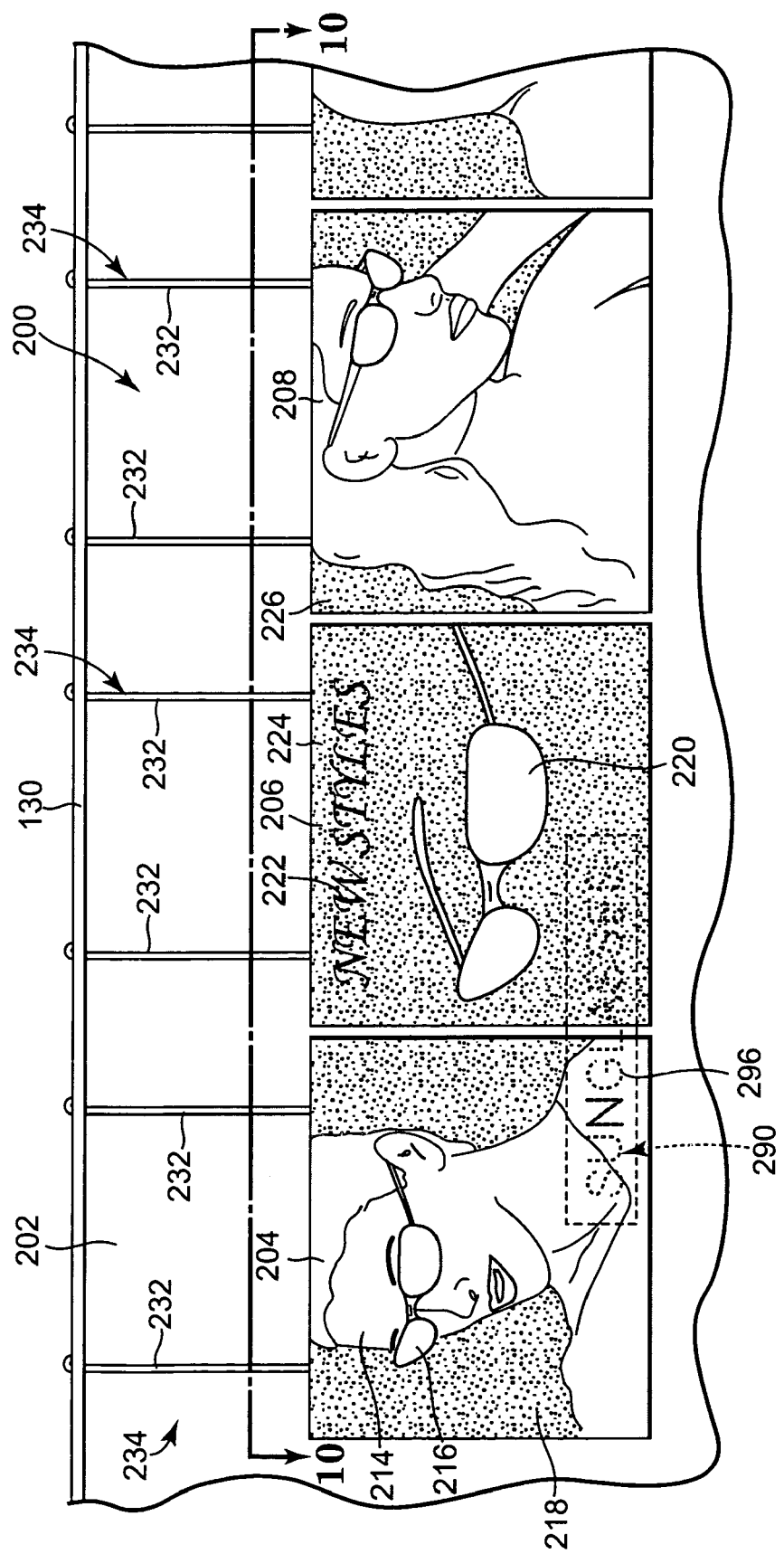
FIG. 9 is a front view illustrating one embodiment of a retail display, according to the present invention.

In one embodiment, a feature panel 290, illustrated in FIGS. 9 and 13 with dashed lines, is included to further integrate the appearance of retail display articles 204 and 206. Featured panel 290 is formed similar to retail display articles 204, 206, and 208 but on a smaller scale. As such, feature panel 290 includes a back panel 292 and a photograph or representation 294 mounted to back panel 292. Feature panel 290, more particularly, photograph 294, includes graphical and/or textural indicia 296 designed to add to the collective imagery of display system 200. Feature panel 290 is secured to retail display articles 204 and 206, more particularly, to photograph 212 of display articles 204 and 206, with double stick tape or other adhesive to secure feature panel to the remainder of display system 200. In other embodiments, multiple feature pattern panels, such as feature panel 290, are included in multiple locations of display system 200.

Display systems according to embodiments of the present invention provide for inexpensive and relatively lightweight solutions to displaying products in use in a stylistic or realistic manner. In particular, display systems according to embodiments of the present invention provide an illusion or reality of three-dimensional display utilizing originally two-dimensional materials. By utilizing materials that can be broken down into two-dimensional forms, the components of the display systems according to embodiments of the present invention are easily shipped to or stored by the retail establishments using the display systems.

In addition, the various components the retail display systems described above can be interchangeably arranged to provide numerous possible combinations of components to create overall collective displays. For example, in one embodiment, retail display articles 10 and/or 140 can be incorporated with display system 200 to provide yet another type of display system. In one embodiment, a retail display article 10 or 140 is positioned in front of retail panel 206 illustrated in FIG. 10. With this in mind, a plethora of display systems can be devised with the components described in the present application.

Although the invention has been described with respect to particular embodiments, such embodiments are for illustrative purposes only and should not be considered to limit the invention. Various alternatives and changes will be apparent to those of ordinary skill in the art. For example, although display articles 10, 140, 160, 204, 206, and 208 and feature panel 290 are described as photographs mounted on back panels, in other embodiments, the photographs and are alternately printed directly to the back panels. In addition, the various attributes of display articles 10, 140, 160, 204, 206, and 208 can be interchangeably used to form another display article not specifically described herein. Furthermore, other components that can possibly be incorporated into display articles will be apparent to those of ordinary skill in the art. Additional modifications and changes will further be apparent to those of ordinary skill in the art.

What is claimed is:

1. A retail display article based upon an original photograph of a subject including at least one item of clothing and having at least one visible portion of skin, the display article comprising:
   a back panel defining a flat surface; and
   a display photograph depicting an edited version of the original photograph such that the at least one visible portion of skin depicted in the display photograph is configured to imitate a general appearance of a mannequin;
   wherein the display photograph is disposed on the back panel, and the display photograph and the back panel are collectively cut about the perimeter of the subject.

2. The retail display article of claim 1, wherein the display photograph differs from the original photograph in at least one of a color of the at least one visible portion of skin, a severity of imperfections in the at least one visible portion of skin, a depiction of a neck cap instead of a subject head, and a deleted appendage of the subject.

3. The retail display article of claim 1, further comprising:
   a mounting bracket coupled to the back panel opposite the photograph and configured to facilitate hanging of the display article.

4. The retail display article of claim 3, wherein the mounting bracket is generally two-dimensional and includes at least one aperture configured to receive a hanger.

5. The retail display article of claim 1, wherein the display photograph additionally depicts at least one fixture appearing to support the subject.

6. The retail display article of claim 1, wherein the original photograph is a first original photograph, and the display photograph additionally depicts at least a portion of a second original photograph.

7. The retail display article of claim 1, further comprising:
   a pillowed edge extending around a perimeter of the subject.

8. The retail display article of claim 1, wherein the back panel defines a back surface opposite the display photograph, and wherein the back panel and the display photograph are rolled toward the back surface of the back panel.

9. A retail display article comprising:
   means for depicting a product;
   means for strengthening the means for depicting the product, wherein the means for depicting a product is coupled to the means for strengthening;
   means for hanging the means for depicting the product and the means for strengthening from an overhead support structure; and
   means for providing the retail display article with a three-dimensional appearance;
   wherein the means for hanging includes means for interfacing with the overhead support structure, means for interfacing with the means for strengthening, and means for spacing the means for interfacing with the overhead support structure from the means for interfacing with the means for strengthening.

10. The retail display article of claim 9, wherein the means for providing the retail display article with the three-dimensional appearance includes means for spacing the means for strengthening from a wall.

11. A retail display system comprising:
   a plurality of support rods extending parallel to one another;
   a first two-dimensional display article including a first photograph of a first product disposed on a first support panel, the first two-dimensional display article hung from a first support rod of the plurality of support rods; and
   a second two-dimensional display article including a second photograph of a second product disposed on a second support panel, the second two-dimensional display article independently hung from a second support rod of the plurality of support rods such that the second two-dimensional display article is hung parallel to the first two-dimensional display article;
   wherein the first photograph depicts a model and a product, and further wherein the first support panel and the first photograph are cut around a perimeter of the model and the product to define a cut edge.

12. The retail display system of claim 11, wherein the first and second two-dimensional display articles are vertically aligned.

13. The retail display system of claim 11, wherein each of the first and second two-dimensional display articles further includes at least one mounting bracket, the retail display system further comprising:
a plurality of hanger members, wherein one of the plurality of hanger members is coupled to each of the at least one mounting brackets and extends to one of the plurality of support rods to hang the respective two-dimensional display article.

14. The retail display system of claim 13, wherein each of the plurality of hanger members is similar in length to the other plurality of hanger members.

15. The retail display system of claim 11, wherein the first photograph additionally depicts a fixture supporting at least one of the model and the product.

16. The retail display system of claim 11, wherein the first photograph depicts a product and a background.

17. The retail display system of claim 11, further comprising: a feature panel coupled to at least one of the first photograph of the first two-dimensional display article and the second photograph of the second two-dimensional display article.

18. A retail display system comprising:
a plurality of support rods extending parallel to one another;
a first two-dimensional display article including a first photograph of a first product disposed on a first support panel, the first two-dimensional display article hung from a first support rod of the plurality of support rods;
a second two-dimensional display article including a second photograph of a second product disposed on a second support panel, the second two-dimensional display article independently hung from a second support rod of the plurality of support rods such that the second two-dimensional display article is hung parallel to the first two-dimensional display article; and
a triangular spacer coupled to and extending from a first end of the first support panel opposite the first photograph.

19. The retail display system of claim 18, wherein the triangular spacer interfaces with a wall opposite the first support panel.

20. The retail display system of claim 18, wherein the triangular spacer is formed by folding a two-dimensional material.

21. The retail display system of claim 18, wherein the triangular spacer includes a first panel, a second panel adjacent the first panel, and third panel adjacent the second panel, and further wherein the second panel is visible from a side of the first two-dimensional display article such that the first two-dimensional display article and the triangular spacer collectively appear as a three-dimensional sign.

22. The retail display system of claim 21, wherein a background image is disposed on the second panel of the triangular spacer similar to a background image included in the first photograph disposed on the first support panel.

23. The retail display system of claim 18, wherein the triangular spacer is a first triangular spacer, and the retail display system includes a second triangular spacer.

24. The retail display system of claim 23, wherein first support panel defines a second end opposite the first end, and further wherein the second triangular spacer is coupled to the second end of the first support panel opposite the first photograph.

25. The retail display system of claim 23, wherein first support panel defines a second end opposite the first end, and the retail system further comprises:

a third two-dimensional display article including a third photograph of a third product disposed to a third support panel, the third two-dimensional display article hung from the first support rod such that a first end of the third support panel hangs adjacent to the second end of the first support panel.

26. The retail display system of claim 25, wherein the third support panel defines a second end opposite to the first end of the third support panel, and further wherein the second triangular spacer is coupled to the second end of the third support panel opposite the third photograph.

27. A method of constructing a retail display system, comprising:
securing a photograph depicting a mannequin wearing a product for sale to a support panel to form a display article;
hanging the display article from one of a plurality of parallel support rods extending over a display area;
positioning a retail good corresponding to the product depicted in the photograph in proximity to the display article; and
cutting the display article around a perimeter of the mannequin wearing the product for sale depicted in the photograph.

28. A method of constructing a retail display system, comprising:
creating a photograph depicting a mannequin wearing a product for sale by editing an original photograph of a model wearing the product for sale to appear similar to the mannequin wearing the product for sale;
securing the photograph to a support panel to form a display article;
hanging the display article from one of a plurality of parallel support rods extending over a display area; and
positioning a retail good corresponding to the product depicted in the photograph in proximity to the display article;
wherein editing the photograph includes at least one of adjusting a color of a skin of the model, applying a filter to the skin of the model, applying a neck cap to the model, and removing at least a portion of an appendage of the model.

29. A method of constructing a retail display system, comprising:
securing a photograph depicting a mannequin wearing a product for sale to a support panel to form a display article;
hanging the display article from one of a plurality of parallel support rods extending over a display area; and
positioning a retail good corresponding to the product depicted in the photograph in proximity to the display article;
wherein the display article is a first display article, the method further comprising:
providing a second display article including a second photograph; and
hanging the second display article parallel to and laterally offset from the first display article on another one of the plurality of parallel support rods.

30. The method of claim 29, wherein hanging the first display article includes coupling a first mounting bracket to the first display article and extending a first hanger member between the mounting bracket and the one of the plurality of parallel support rods, and further wherein hanging the second display article includes coupling a second mounting bracket to the second display article and extending a second hanger member between the mounting bracket and the other one of the plurality of parallel support rods.

31. The method of claim 30, wherein coupling the first mounting bracket includes securing the first mounting bracket to the first display article at a first position and securing the second mounting bracket to the second display article at a second position, and further wherein the first position relative to the first display article is different than the second position relative to the second display article such that the first display article is positioned from the plurality of support rods a first distance different than a second distance that the second display article is positioned from the plurality of support rods.

32. The method of claim 31, wherein the first hanger member and the second hanger member are similar in length.

33. A retail display article comprising:
means for depicting a product;
means for strengthening the means for depicting the product, wherein the means for depicting a product is coupled to the means for strengthening;
means for hanging the means for depicting the product and the means for strengthening from an overhead support structure; and
means for providing the retail display article with a three-dimensional appearance, wherein the means for providing the retail display article with the three-dimensional appearance includes rolling the means for depicting a product and the means for strengthening toward a back surface of the means for strengthening.

34. A retail display system comprising:
a plurality of support rods extending parallel to one another;
a first two-dimensional display article including a first photograph of a first product disposed on a first support panel, the first two-dimensional display article hung from a first support rod of the plurality of support rods; and
a second two-dimensional display article including a second photograph of a second product disposed on a second support panel, the second two-dimensional display article independently hung from a second support rod of the plurality of support rods such that the second two-dimensional display article is hung parallel to the first two-dimensional display article;
wherein edges of the first photograph and the first support panel are each rolled toward a back surface of the first support panel.

35. A method of constructing a retail display system, comprising:
securing a photograph depicting a mannequin wearing a product for sale to a support panel to form a display article;
hanging the display article from one of a plurality of parallel support rods extending over a display area;
positioning a retail good corresponding to the product depicted in the photograph in proximity to the display article; and
rolling the display article toward a surface of the support panel opposite the photograph to enhance the three-dimensional appearance of the display article.

* * * * *